(12) United States Patent
Maruyama et al.

(10) Patent No.: US 9,055,275 B2
(45) Date of Patent: Jun. 9, 2015

(54) IMAGE INFORMATION PLAYBACK UNIT, IMAGE INFORMATION PLAYBACK DEVICE AND SYNCHRONIZATION CONTROL METHOD

(75) Inventors: Kiyoyasu Maruyama, Tokyo (JP); Satoshi Michihata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 70 days.

(21) Appl. No.: 14/110,832

(22) PCT Filed: Oct. 7, 2011

(86) PCT No.: PCT/JP2011/073224
§ 371 (c)(1),
(2), (4) Date: Oct. 9, 2013

(87) PCT Pub. No.: WO2012/153434
PCT Pub. Date: Nov. 15, 2012

(65) Prior Publication Data
US 2014/0029910 A1 Jan. 30, 2014

(30) Foreign Application Priority Data
May 11, 2011 (JP) ................................. 2011-106225

(51) Int. Cl.
| H04N 5/93 | (2006.01) |
| H04N 9/87 | (2006.01) |
| H04N 21/41 | (2011.01) |
| H04N 21/43 | (2011.01) |

(Continued)

(52) U.S. Cl.
CPC ............. *H04N 9/87* (2013.01); *H04N 21/4122* (2013.01); *H04N 21/4307* (2013.01); *G06F 3/1446* (2013.01); *G09G 5/008* (2013.01); *G09G 2300/026* (2013.01); *G09G 2320/103* (2013.01); *G09G 2340/0435* (2013.01); *G09G 2356/00* (2013.01)

(58) Field of Classification Search
None
See application file for complete search history.

(56) References Cited

U.S. PATENT DOCUMENTS

| 2003/0016223 A1 | 1/2003 | Miyauchi |
| 2003/0091115 A1 | 5/2003 | Yamana et al. |
| 2012/0128315 A1 | 5/2012 | Asami |

FOREIGN PATENT DOCUMENTS

| JP | 9-9164 A | 1/1997 |
| JP | 10-260665 A | 9/1998 |
| JP | 11-177884 A | 7/1999 |

(Continued)

*Primary Examiner* — William C Vaughn, Jr.
*Assistant Examiner* — Eileen Adams
(74) *Attorney, Agent, or Firm* — Birch, Stewart, Kolasch & Birch, LLP

(57) ABSTRACT

Each of image information playback units (11, 21) detects that image display has started, on the basis of a change in digital video data (VDa, VDb), and generates a frame number (FNa, FNb) (103, 203). One of the image information playback units (11) combines frame signals that output frame synchronization signals (FSa) (104). The other image information playback unit (21) separates the frame synchronization signals (FSa) and generates a frame number (SFNa) (205). The generated frame number (SFNa) and the frame number (FNb) generated in the second image information playback unit (21) are compared, and on the basis of the comparison results the frequency of the decoding reference clock signal is controlled (206). When images are displayed by a plurality of display units (15, 25) connected to the image information playback units (11, 21), the images can be synchronized with a simple structure.

9 Claims, 12 Drawing Sheets

(51) Int. Cl.
*G06F 3/14* (2006.01)
*G09G 5/00* (2006.01)

(56) References Cited

FOREIGN PATENT DOCUMENTS

| | | |
|---|---|---|
| JP | 2001-268517 A | 9/2001 |
| JP | 2003-30641 A | 1/2003 |
| JP | 2003-153128 A | 5/2003 |
| JP | 2003-219309 A | 7/2003 |
| JP | 2004-228747 A | 8/2004 |
| JP | 2005-86592 A | 3/2005 |
| JP | 2005-300845 A | 10/2005 |
| JP | 2008-129075 A | 6/2008 |
| JP | 2009-122412 A | 6/2009 |
| JP | 2011-30019 A | 2/2011 |

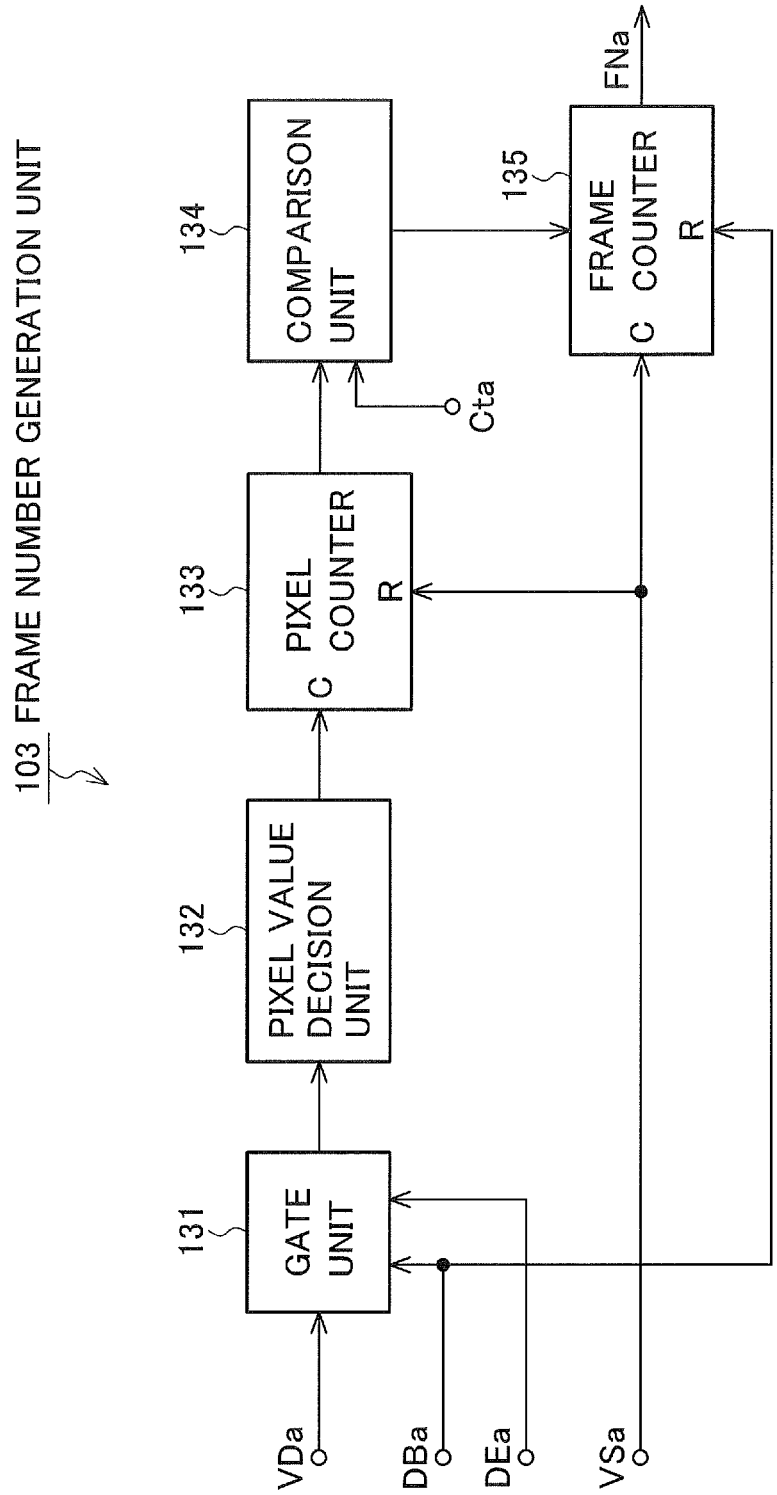

FIG.3(a) VCa 
FIG.3(b) VSa 
pVSa
FIG.3(c) HSa 
FIG.3(d) DEa 
FIG.3(e) VDa 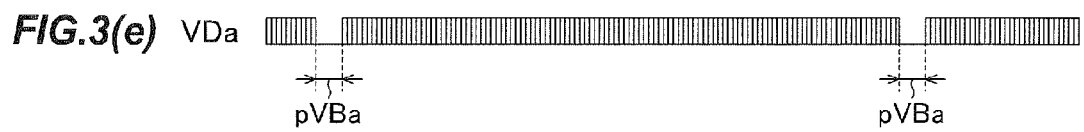
pVBa          pVBa
FIG.4(a) VCa 
FIG.4(b) VSa 
FIG.4(c) HSa 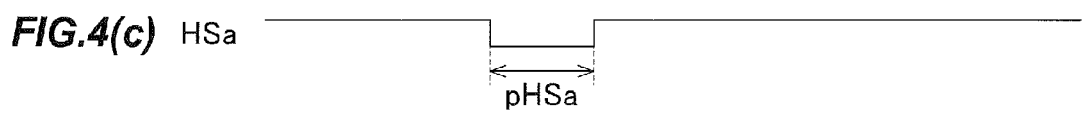
pHSa
FIG.4(d) DEa 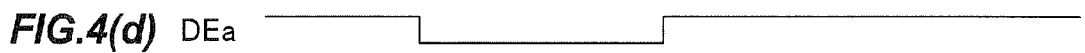
FIG.4(e) VDa 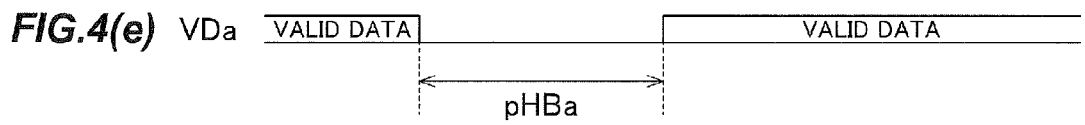
pHBa
FIG.5(a) VCa 
FIG.5(b) VSa 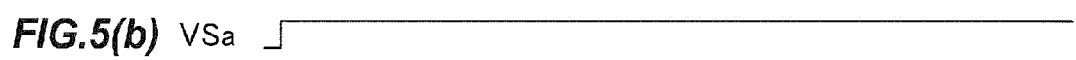
FIG.5(c) HSa 
FIG.5(d) DEa 
FIG.5(e) VDa 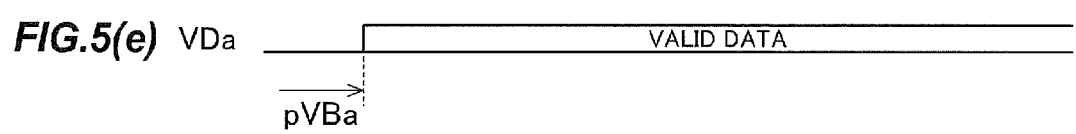
pVBa

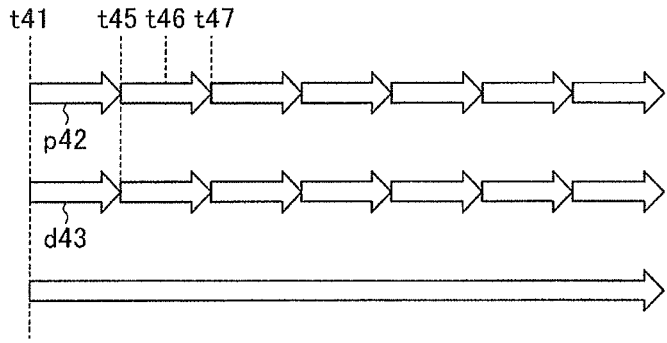
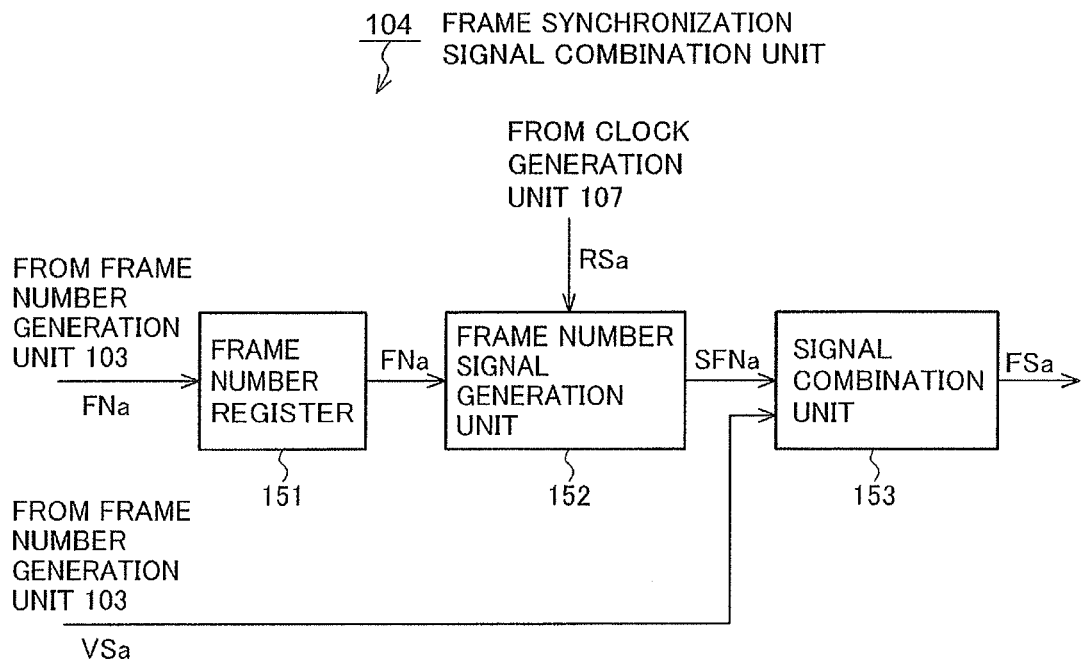
*FIG.7*

*FIG.8(a)* RSa 
*FIG.8(b)* SFNa 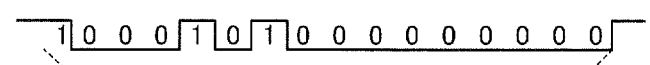
*FIG.8(c)* VSa 
*FIG.8(d)* FSa 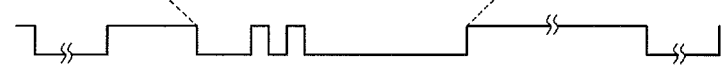
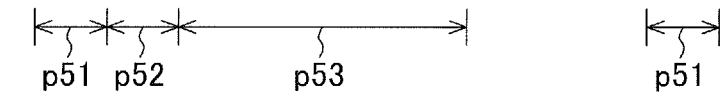

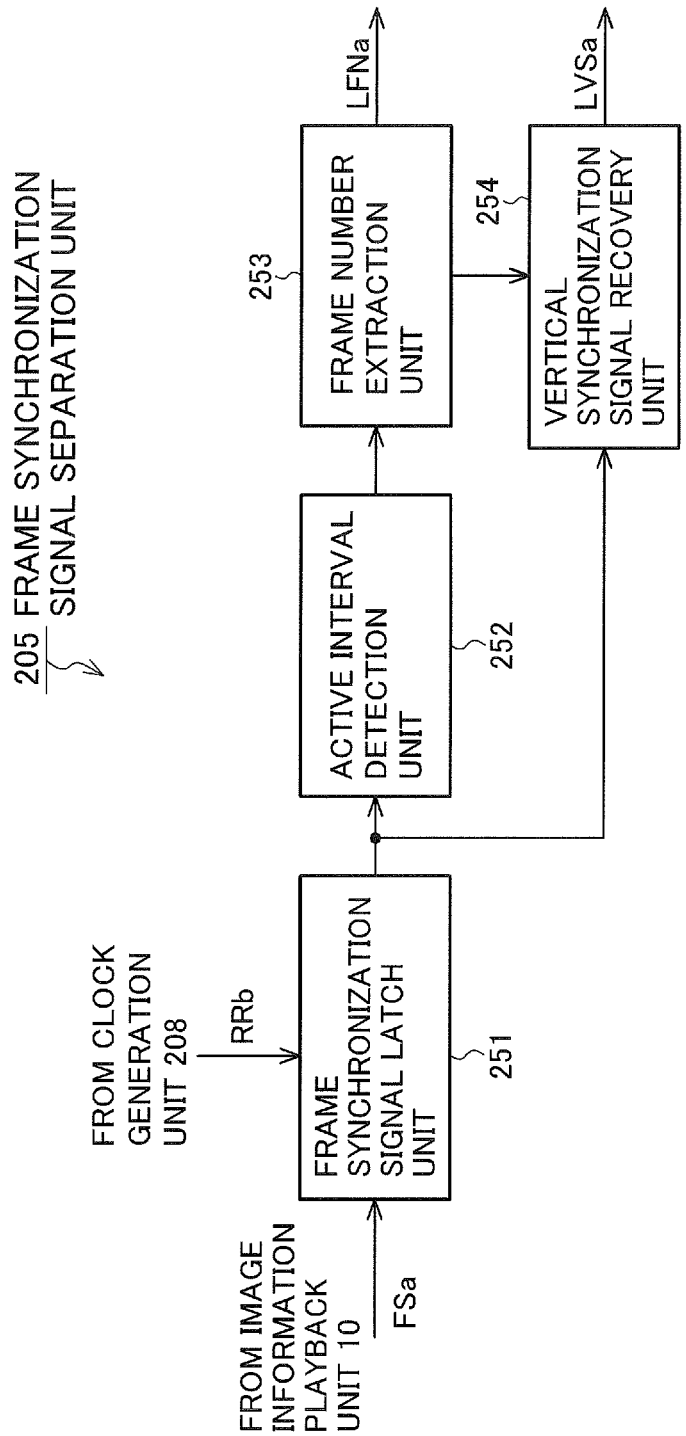

IMAGE INFORMATION PLAYBACK UNIT, IMAGE INFORMATION PLAYBACK DEVICE AND SYNCHRONIZATION CONTROL METHOD

TECHNICAL FIELD

The present invention relates to an image information playback unit, an image information playback device, and a synchronization control method. The invention relates in particular to an image information playback device and synchronization control method for synchronized output by a plurality of image information playback units of image signals representing content to be reproduced, and to the image information playback units used in this type of image information playback device.

BACKGROUND ART

As an advertising medium, a digital signage system utilizes digital technology in the images to be displayed and in the control of the display. For example, digital signage systems are installed on the walls of department stores, supermarkets, and other commercial facilities, and in railway signs, road signs, and signs at other public facilities. Image content may be displayed by compressing digitized video data by a coding technique complying with a standard such as MPEG-2 or H.264, distributing the compressed video data through a network etc., and temporarily storing the compressed video data before reproduction. Alternatively, reproduction follows distribution immediately on a real-time basis. Digital signage systems can provide a wide variety of image expression: a large screen may be configured by use of multiple display units in order to enable distant viewing, or a plurality of display units may be arranged horizontally or vertically, in such a manner as to suite the installation site, and their individual displays may be linked cooperatively.

One proposed method of image display synchronization to be used when an image is displayed on a plurality of display units in the way explained above, and when a single image is divided up for display on the individual display units, is to store the image data in a memory as digital video data and have image processing units corresponding to the individual display units read the digital video data in synchronization (see Patent Reference 1, for example).

In another method having been proposed for synchronizing digital video signals to be decoded in a plurality of individual playback units for reproducing digitally encoded content data, when a screen is displayed by connecting the playback units to corresponding display units, one of the plurality of playback units is used as a master playback unit and the rest are used as slave playback units, and the master playback unit transmits a reference clock to the individual slave playback units, which decode the data in synchronization with the clock transmitted from the master playback unit in order to display the screen (see Patent Reference 2, for example).

PRIOR ART REFERENCES

Patent References

Patent Reference 1: Japanese Patent Application Publication No. 2003-153128
Patent Reference 2: Japanese Patent Application Publication No. 2001-268517

SUMMARY OF THE INVENTION

Problems to be Solved by the Invention

The method of synchronizing the reading of the digital video data by storing, in a memory, the digital video data of video images to be displayed on the display units raises the problem of a great increase in the size of the memory that stores the digital video data. For example, if a display system is configured to form a large screen of 3840×2160-dots by installing four 1920×1080-dot display units, one digital video data item has 3840×2160 dots, and a memory capable of storing this large amount of data is required.

Supplying a high-frequency clock from one playback unit to another playback unit raises problems such as signal attenuation and waveform rounding, and avoiding these problems leads to further problems in that special interconnection techniques are required.

A playback unit for decoding MPEG-2 and H.264-compliant image signals generally adjusts the time interval from the start of decoding of the content data to the output of the digital video signal by using a PTS (Presentation Time Stamp). However, jitter and inadequate accuracy in the reference clock signal may cause deviation of the output timing of the digital video signals, so that even if the same content data are input to the plurality of playback units at the same time, the image signals that are displayed become unsynchronized and the image output timings of the plurality of playback units do not match, resulting in a poor quality display.

The present invention addresses the above problems with the object of enabling a video information playback device including a plurality of video information playback units to output the image signals such that the images are displayed in synchronization on the display units corresponding to the individual video information playback units.

Means for Solving the Problem

A video information playback unit according to the invention includes:

a clock generation unit that generates a decode reference clock signal;

a decoder that receives, as inputs, the decode reference clock signal supplied from the clock generation unit and content data including an image, outputs digital video data, a vertical synchronization signal, a horizontal synchronization signal, and a video clock, and also outputs a decode begin signal indicating that the decoder has started decoding the content data;

a frame number generation unit that receives, as inputs, the digital video data, the vertical synchronization signal, the video clock, and the decode begin signal, and after recognizing from the decode begin signal that decoding has started, recognizes from a change in the digital video data that display of the image has started, and generates a frame number based on the vertical synchronization signal;

a frame synchronization signal combination unit that combines the frame number generated by the frame number generation unit and the vertical synchronization signal output from the decoder and outputs a frame synchronization signal;

a frame synchronization signal separation unit that receives, as an input, a reference frame synchronization signal or a fixed level signal and, when the reference frame synchronization signal is input, separates the input frame synchronization signal and outputs a reference vertical synchronization signal and a reference frame number; and a clock control unit that compares the frame number generated by the frame number generation unit with the frame number output from the frame synchronization signal separation unit, further compares generation timings of the vertical synchronization signal output from the decoder and the vertical synchronization signal output from the frame synchronization signal separation unit, and generates a clock control signal based on results of the comparison; wherein the clock generation unit adjusts a frequency of the decode reference clock signal on a basis of the clock control signal output from the clock control unit.

Effects of the Invention

According to the invention, two images can be synchronized by a comparison between the frame number and the vertical synchronization signal of the displayed image decoded by the decoder in one image information playback unit and the frame number and the vertical synchronization signal of the displayed image decoded by the decoder in another image information playback unit, so that high quality image display is possible.

The above frame numbers can be generated by use of the vertical synchronization signals and the digital video data used for the display, so that a general purpose decoder can be used.

BRIEF DESCRIPTION OF THE DRAWINGS

FIG. 2 is a block diagram showing an exemplary configuration of the frame number generation unit 103 in FIG. 1.

FIGS. 3(a) to 3(e) are diagrams illustrating relationships among the digital video data VDa, the video clock VCa, the vertical synchronization signal VSa, the horizontal synchronization signal HSa, and the data enable signal DEa generated in a first image information playback unit 10 in the first embodiment.

FIGS. 4(a) to 4(e) are diagrams showing the parts of FIGS. 3(a) to 3(e) preceding and following one active interval of the horizontal synchronization signal HSa shown in FIG. 3(c), expanded in the time axis direction.

FIGS. 5(a) to 5(e) are diagrams showing the parts of FIGS. 3(a) to 3(e) immediately after a low to high transition of the vertical synchronization signal VSa shown in FIG. 3(b), expanded in the time axis direction.

FIGS. 6(a) to 6(c) are diagrams illustrating the digital video data output at the start of decoding by the decoder 101 in FIG. 1.

FIG. 7 is a block diagram showing an exemplary configuration of the frame synchronization signal combination unit 104 in FIG. 1.

FIGS. 8(a) to 8(e) are diagrams illustrating the generation of the frame synchronization signal by the frame synchronization signal combination unit 104 in FIG. 1.

FIG. 9 is a block diagram showing an exemplary configuration of the frame synchronization signal separation unit 205 in FIG. 1.

FIGS. 10(a) to 10(e) are diagrams illustrating the frame synchronization signal latching process in the frame synchronization signal separation unit 205 in FIG. 1.

FIGS. 11(a) to 11(c) are diagrams showing one active interval, and preceding and following parts, of the frame synchronization signal input to the frame synchronization signal separation unit 205 in FIG. 1.

FIGS. 12(a) to 12(c) are diagrams showing comparison timings in the clock control unit 206 in FIG. 1.

MODE FOR CARRYING OUT THE INVENTION

Embodiments of the invention will now be described in detail.

First Embodiment

Figure 1:
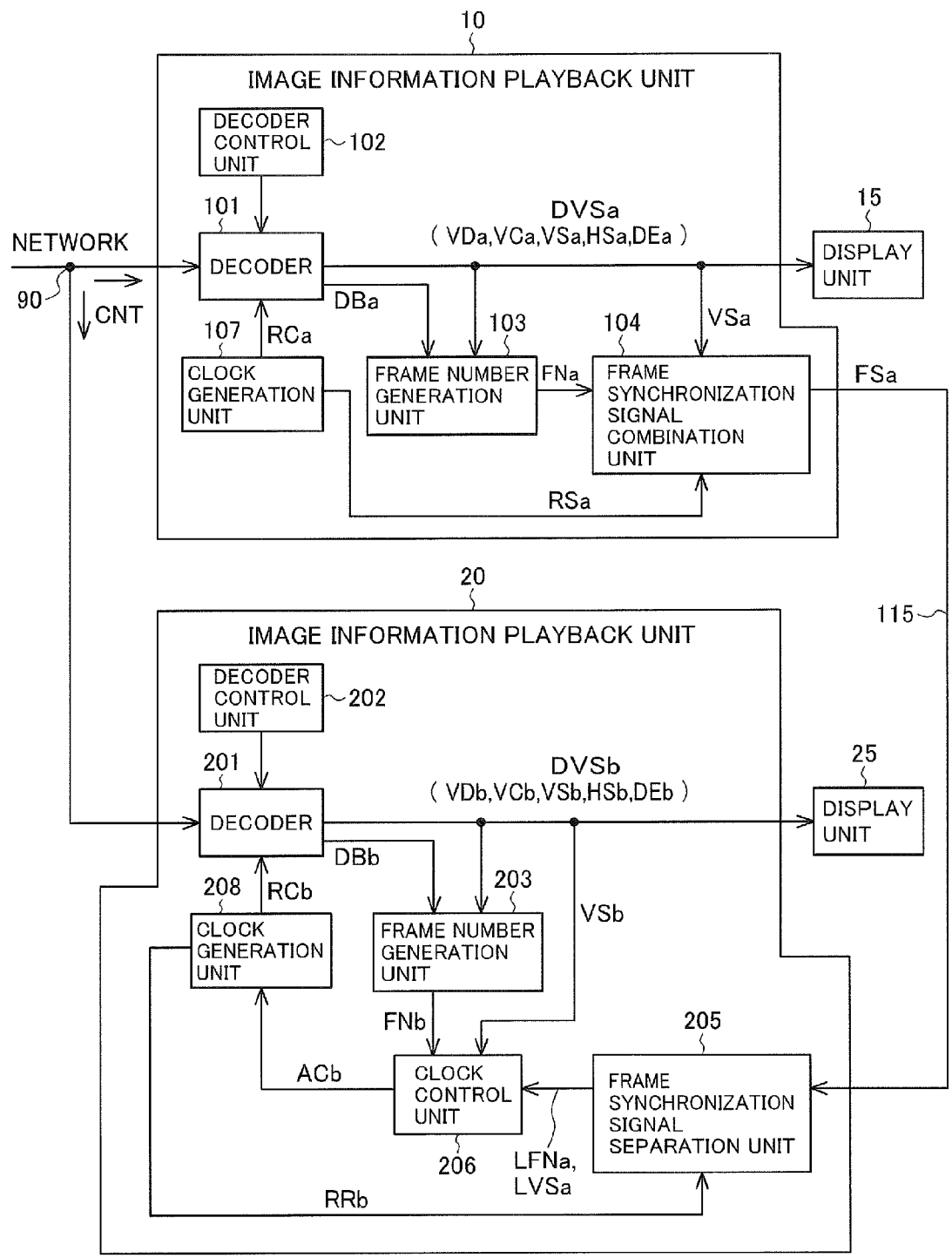
FIG. 1 is a block diagram showing the configuration of the image information playback device in a first embodiment of the present invention.

FIG. 1 shows the image information playback device in the first embodiment of the invention. The illustrated image information playback device includes a first image information playback unit 10 and a second image information playback unit 20, each connected to a network 90 through which content data CNT are input.

The content data CNT input to the first image information playback unit 10 and the content data CNT input to the second image information playback unit 20 may represent mutually identical content or different content.

In this embodiment, the first image information playback unit 10 outputs a frame synchronization signal FSa, and the second image information playback unit 20 adjusts the timing of its internal operation to synchronize with the frame synchronization signal FSa output from the first image information playback unit 10, as described in detail below.

Accordingly, in relation to operation timing, the first image information playback unit 10 can be regarded as functioning as a master and the second image information playback unit 20 as functioning as a slave.

First, the image information playback unit 10 will be described.

The information playback unit 10 includes a decoder 101, a decoder control unit 102, a frame number generation unit 103, a frame synchronization signal combination unit 104, and a clock generation unit 107, and supplies signals to make a display unit 15 display an image.

The decoder 101 receives, as an input, the content data CNT, also receives a decode reference clock RCa from the clock generation unit 107, and generates a digital video signal DVSa. The digital video signal DVSa output from the decoder 101 includes digital video data VDa, a reference video clock VCa, a vertical synchronization signal VSa, a horizontal synchronization signal HSa, and a data enable signal DEa indicating valid data intervals. The digital video data VDa include 8-bit data constituting digital data representing the red component, green component, and blue component of the video signal.

The decoder 101 also outputs a decode begin signal DBa indicating that decoding has started.

The decoder control unit 102 controls the starting and stopping of decoding in the decoder 101.

The display unit 15 receives, as an input, the digital video signal DVSa and displays the image.

The frame number generation unit 103 receives, as inputs, the digital video signal DVSa and the decode begin signal DBa that are output from the decoder 101, uses the digital video data VDa, the video clock VCa, and the vertical synchronization signal VSa to generate a frame number FNa based on the decode begin signal DBa, and supplies the frame number FNa to the frame synchronization signal combination unit 104.

The frame synchronization signal combination unit 104 combines the frame number FNa generated in the frame number generation unit 103 and the vertical synchronization signal VSa output from the decoder 101 and outputs the result of the combination as a frame synchronization signal FSa. The frame number FNa and the vertical synchronization signal VSa are combined by superimposing the pulse train indicating the frame number FNa on specific parts of the vertical synchronization signal VSa.

The clock generation unit 107 supplies clocks to the other sections of the image information playback unit 10. The clocks include a decode reference clock RCa supplied to the decoder 101 and a combining reference clock RSa supplied to the frame synchronization signal combination unit 104.

Next, the image information playback unit 20 will be described.

The image information playback unit 20 includes a decoder 201, a decoder control unit 202, a frame number generation unit 203, a frame synchronization signal separation unit 205, a clock control unit 206, and a clock generation unit 208, and supplies signals to make a display unit 25 display an image.

The decoder 201 receives, as an input, the content data CNT, also receives a decode reference clock supplied from the clock generation unit 208, and generates a digital video signal DVSb. Like the digital video signal DVSa output from the decoder 101 of the image information playback unit 10, the digital video signal DVSb output from the decoder 201 includes digital video data VDb, a reference video clock VCb, a vertical synchronization signal VSb, a horizontal synchronization signal HSb, and a data enable signal DEb indicating valid data intervals. The digital video data VDb include 8-bit data constituting digital data representing the red component, green component, and blue component of the video signal.

The decoder 201 also outputs a decode begin signal DBb indicating that decoding has started.

The decoder control unit 202 controls the starting and stopping of decoding in the decoder 201.

The display unit 25 receives, as an input, the digital video signal DVSb, and displays the image.

The frame number generation unit 203 receives, as inputs, the digital video signal DVSb and the decode begin signal DBb output from the decoder 201, uses the digital video data VDb, the video clock VCb, and the vertical synchronization signal VSb to generate a frame number FNb based on the decode begin signal DBb, and supplies the frame number FNb to the clock control unit 206.

The frame synchronization signal separation unit 205 receives the frame synchronization signal FSa output from the frame synchronization signal combination unit 104 in the image information playback unit 10 and transmitted through a signal line 115 and separates the frame synchronization signal FSa, and generates a vertical synchronization signal LVSa and a frame number LFNa.

The clock control unit 206 receives, as inputs, the frame number FNb output from the frame number generation unit 203, the vertical synchronization signal VSb output from the decoder 201, and the frame number LFNa and the vertical synchronization signal LVSa output from the frame synchronization signal separation unit 205, compares the frame numbers FNb and LFNa, compares the timings at which the vertical synchronization signal VSb is generated with the timings at which the vertical synchronization signal LVSa is generated, and outputs a clock control signal ACb based on the results of the comparison.

The clock control signal ACb controls the clock signal by:

reducing the clock frequency of the clock generation unit 208 when the frame number FNb is greater than the frame number LFNa or when the frame number FNb matches the frame number LFNa and the vertical synchronization signal VSb leads the vertical synchronization signal LVSa;

increasing the clock frequency of the clock generation unit 208 when the frame number FNb is less than the frame number LFNa or when the frame number FNb matches the frame number LFNa and the vertical synchronization signal VSb lags the vertical synchronization signal LVSa; and keeping the clock frequency of the clock generation unit 208 at the same (unchanged) value when the frame number FNb matches the frame number LFNa and the generation timing of the vertical synchronization signal VSb matches the generation timing of the vertical synchronization signal LVSa.

The clock generation unit 208 generates clocks with frequencies adjusted on the basis of the clock control signal ACb output by the clock control unit 206. The clocks generated by the clock generation unit 208 are supplied to the other sections in the image information playback unit 20. The clocks include a decode reference clock RCb supplied to the decoder 201 and a separation reference clock RRb (40 MHz) supplied to the frame synchronization signal separation unit 205.

The clock generation unit 208 is configured of a frequency-variable clock oscillator such as, for example, a voltage controlled crystal oscillator (VCXO).

Next, the operation of the video information playback device in FIG. 1 will be described in detail.

The decoder 101 of the image information playback unit 10 starts decoding the content data CNT input from the network 90 under the control of the decoder control unit 102.

At the start of decoding, the decoder 101 outputs the decode begin signal DBa indicating that decoding has started.

The decode begin signal DBa may be output in response to the reception of the content data CNT. It may also be output when the decoder control unit 102 has directed the decoder 101 to start decoding.

The decoder 101 decodes the content data CNT and outputs the digital video signal DVSa including the digital video data VDa, the video clock VCa, the vertical synchronization signal VSa, the horizontal synchronization signal HSa, and the data enable signal DEa. The display unit 15 receives the digital video signal DVSa and displays an image.

Next, an exemplary configuration of the frame number generation unit 103 and its operation will be described with reference to FIG. 2.

The frame number generation unit 103 shown in FIG. 2 includes a gate unit 131, a pixel value decision unit 132, a pixel counter 133, a comparison unit 134, and a frame counter 135.

The frame number generation unit 103 receives, as inputs, the digital video data VDa, the video clock VCa, the vertical synchronization signal VSa, the horizontal synchronization signal HSa, the data enable signal DEa, and the decode begin signal DBa.

The relationships among the digital video data VDa, the video clock VCa, the vertical synchronization signal VSa, the horizontal synchronization signal HSa, and the data enable signal DEa will be described with reference to FIGS. 3(a) to 3(e). The video clock VCa in FIG. 3(a) is a pulse train that changes repetitively between the high and low levels, forming a reference signal for the other signals.

Since the decoder 101 operates in synchronization with the decode reference clock RCa supplied from the clock generation unit 107, the video clock VCa is synchronized with the decode reference clock RCa.

The vertical synchronization signal VSa shown in FIG. 3(b) is a synchronization signal that delimits frames, the horizontal synchronization signal HSa shown in FIG. 3(c) is a synchronization signal that delimits horizontal lines, and both are reference signals for displaying the image on the display unit 15. In the illustrated example, the low level intervals of the vertical synchronization signal VSa and the horizontal synchronization signal HSa are the active intervals (the vertical synchronization signal active interval pVSa, and the horizontal synchronization signal active interval pHSa). The frequency of the horizontal synchronization signal HSa is higher than the frequency of the vertical synchronization signal VSa.

FIGS. 4(a) to 4(e) show the signal waveforms of the preceding and following parts of the horizontal synchronization signal in FIG. 3(c), expanded in the time axis direction.

FIGS. 5(a) to 5(e) show the signal waveform of the vertical synchronization signal in FIG. 3(b) in the interval immediately after the low to high transition, expanded in the time axis direction.

The data enable signal DEa shown in FIG. 3(d) indicates the valid data interval of the digital video data; it becomes valid (high) only when the vertical synchronization signal VSa and the horizontal synchronization signal HSa are both high (invalid). More specifically, it becomes valid (goes high) in intervals other than the vertical blanking interval pVBa including the vertical synchronization signal active period pVSa shown in FIG. 3(e) and the horizontal blanking interval pHBa including the horizontal synchronization signal active interval pHSa shown in FIG. 4(e).

The digital video data VDa shown in FIG. 3(e) are used as valid data for the pixels of the image to be displayed on the display unit 15 when the data enable signal DEa is high.

After recognizing from the decode begin signal DBa that decoding has started, the frame number generation unit 103 reads the valid data (data during the interval (valid interval) in which the data enable signal DEa indicates that the data are valid) of the digital video data VDa on the basis of the data enable signal DEa, over one frame interval from the valid to invalid (low to high) transition of the vertical synchronization signal VSa to its next transition to the valid (high) state. It also counts the number of pixels with valid data values other than 0 in each frame, and decides that there has been a change in the image, that is, that image display has started, when the number of pixels with non-zero values reaches or exceeds a predetermined threshold value Cta during the valid interval for each frame.

For the above operation of the frame number generation unit 103, the gate unit 131 passes the digital video data VDa only after being notified of the start of decoding by the decode begin signal DBa and only when the data enable signal DEa is valid (high).

The pixel value decision unit 132 determines whether the value of each pixel is 0 or not, and when the value is not 0, outputs a decision signal indicating this. The decision signal has a first value, such as 1, for example, when the pixel value is not 0, and otherwise has a second value, such as 0, for example.

The pixel counter 133 is reset to its initial value by the vertical synchronization signal VSa, and then counts the number of times the signal indicating a non-zero pixel value is output from the pixel value decision unit 132.

The comparison unit 134 determines whether or not the count value of the pixel counter 133 is equal to or greater than the predetermined threshold value Cta; when it is equal to or greater than the threshold value Cta, the comparison unit 134 outputs a signal indicating this.

This point will now be described in more detail. FIGS. 6(a) to 6(c) illustrate changes in the digital video data VDa output after the decoder 101 has started decoding. In FIGS. 6(a) to 6(c), the horizontal axis represents time, and the point in time at which the decoder 101 starts decoding is represented by reference characters t41.

After the decode starting time t41, the digital video signal DVSa including the digital video data VDa, the video clock VCa, the vertical synchronization signal VSa, the horizontal synchronization signal HSa, and the data enable signal DEa is output from the decoder 101 (FIG. 6(c)).

Immediately after decoding has started, the decoder 101 is decoding the first image of the content data, and cannot output the digital video data VDa at once (this interval is denoted by reference characters p42 in FIG. 6(a)). Therefore, during the interval p42, the decoder 101 outputs an initial value as the digital data (d43 in FIG. 6(b)). In general, 0 is output as the initial value at this time (the signal level is low in all bits). That is, in the initial state, the values of the pixels represented by the digital data in the frame are all 0.

Output of valid image data (data representing the content of the input content CNT) starts after the decoder 101 becomes ready to output the digital video data VDa (at t45 in FIG. 6(b)).

At this time, if the image displayed is not a black picture (having pixel values of 0 over the entire screen), data representing pixel values other than 0 are output. The pixel value decision unit 132 in the frame number generation unit 103 detects and recognizes this change, and the pixel counter 133 counts the number of pixels of valid data with values other than 0 in the digital video data VDa. The comparison unit 134 determines that image display has started when the number of pixels with values other than 0 reaches or exceeds the threshold value Cta (t46) in each frame.

Here, the reason why the condition for determining that image display has started is that the number of pixels with values other than 0 has reached or exceeded the threshold value Cta is to assure that there has been a definite change in the image, because even in the interval (p42 in FIG. 6(a)) during which the decoder 101 is decoding the first image, the valid data might represent values other than 0 due to noise or the like.

With this configuration, the frame number generation unit 103 can detect that the image display has started, and then, it starts counting the frame number (at t47). At this point the frame number is set to an initial value such as '1', for example. Thereafter, the frame number is incremented by 1 at every synchronization timing (vertical synchronization signal active interval pVSa) defined by the vertical synchronization signal VSa, to count the frame number.

For this operation to take place, the frame counter 135 is reset to an initial value by the decode begin signal DBa; when the comparison unit 134 outputs a signal indicating that image display has started, the current count value is set to the initial value, e.g., '1', and the count is incremented at each subsequent occurrence of the vertical synchronization signal active interval pVSa, and the count value is output as the frame number FNa.

The video clock VCa shown in FIG. 3(a) and the horizontal synchronization signal HSa shown in FIG. 3(c) are used to synchronize the operation of the other sections in the frame number generation unit 103, but the inputs of these signals to the individual parts are omitted in the drawing.

The frame synchronization signal combination unit 104 uses the frame number FNa generated in the frame number generation unit 103 and the vertical synchronization signal VSa output from the decoder 101 to generate the frame synchronization signal FSa. This will be described with reference to FIG. 7.

The frame synchronization signal combination unit 104 shown in FIG. 7 includes a frame number register 151, a frame number signal generation unit 152, and a signal combination unit 153.

The frame number register 151 temporarily stores the frame number FNa generated in the frame number generation unit 103.

The frame number signal generation unit 152 generates a frame number signal SFNa representing the frame number FNa on the basis of the combining reference clock RSa supplied from the clock generation unit 107 and the frame number FNa stored in the frame number register 151.

The signal combination unit 153 combines the frame number signal SFNa generated by the frame number signal generation unit 152 with the vertical synchronization signal VSa output from the decoder 101, and outputs the result of the combination as the frame synchronization signal FSa.

This point will now be described with reference to FIGS. 8(a) to 8(e).

A 5-MHz clock, for example, is used as the combining reference clock RSa shown in FIG. 8(a). If the value in the frame number register 151 is '0x0051', and if it is transmitted in the order from the least significant bit, it is transmitted as '0b1000101000000000', generating the frame number signal SFNa shown in FIG. 8(b).

The signal combination unit 153 in FIG. 7 combines the frame number signal SFNa (FIG. 8(b)) generated by the frame number signal generation unit 152 with the vertical synchronization signal VSa (FIG. 8(c)), as described.

Figure 8E:

In performing this combining operation, the signal combination unit 153 waits for a given interval, such as a 1-μs interval (the interval represented by reference characters p52 in FIG. 8(d)), from the rising edge of the vertical synchronization signal VSa in the vertical blanking interval pVBa (FIG. 8(e)), and then superimposes the frame number signal SFNa on an interval p53 following the interval p52. Except in a vertical synchronization signal active interval p51 (corresponding to the interval pVSa in FIG. 3(b)), the vertical synchronization signal is originally at the high level, but because of the superimposing of the frame number signal SFNa, in the illustrated example, it goes low in the intervals where the frame number signal SFNa is 0 and goes high in the intervals where the frame number signal SFNa is 1.

Reference characters p55 in FIG. 8(e) represent an interval other than the vertical blanking interval pVBa. In the interval p55, intervals other than the horizontal blanking intervals pHBa are valid data intervals (intervals where the data enable signal DEa in FIG. 3(d) and FIG. 5(d) is high).

The active interval p51 of the vertical synchronization signal is generally a low-level interval lasting several tens of microseconds or more, which is longer than one horizontal scan interval. The part p53 of the vertical synchronization signal on which the frame number is superimposed has a length of 3.2 μs. This can be understood from the fact it represents 16-bit data with a 5-MHz clock (one cycle is 0.2 μs), and 0.2 μs×16 is 3.2 μs. The part p53 on which the frame number is superimposed is therefore shorter than the low-level interval (active interval) p51 of the vertical synchronization signal.

Next, the operation of the image information playback unit 20 will be described.

The decoder 201 in the image information playback unit 20 starts decoding the content data CNT input from the network 90 under the control of the decoder control unit 202.

At the start of decoding, the decoder 201 outputs the decode begin signal DBb indicating that decoding has started.

The decode begin signal DBb may be output in response to the reception of the content data CNT. It may also be output when the decoder control unit 202 has directed the decoder 201 to start decoding.

The decoder control unit 202 may exchange operation timing information with the decoder control unit 102 through the network 90 and may perform control at the same time as the decoder control unit 102 over the starting of decoding.

The decoder 201 decodes the content data CNT and outputs the digital video signal DVSb including the digital video data VDb, the video clock VCb, the vertical synchronization signal VSb, the horizontal synchronization signal HSb, and the data enable signal DEb. The display unit 25 receives the digital video signal DVSb and displays an image.

The configuration and operation of the frame number generation unit 203 are similar to the configuration and operation of the frame number generation unit 103 in the image information playback unit 10, but the frame number generation unit 203 receives, as inputs, the digital video data VDb, the video clock VCb, the vertical synchronization signal VSb, the horizontal synchronization signal HSb, and the data enable signal DEb.

After recognizing from the decode begin signal DBb that decoding has started, the frame number generation unit 203 reads the valid data (data during the interval (valid interval) in which the data enable signal DEb indicates that the data are valid) of the digital video data VDb on the basis of the data enable signal DEb, over one frame interval from the valid to invalid (low to high) transition of the vertical synchronization signal VSb to its next transition to the valid (high) state. It also counts the number of pixels with valid data values other than 0 in each frame, and decides that there has been a change in the image, that is, that image display has started, when the number of pixels with non-zero values reaches or exceeds a predetermined threshold value Ctb in each frame interval.

This example assumes that the second display unit 25 has the same screen size (number of pixels in the screen) as the first display unit 15 and the threshold value Ctb used in the second image information playback unit 20 is identical to the threshold value Cta used in the first image information playback unit 10. When the second display unit 25 differs in screen size from the first display unit 15, the threshold value Ctb may differ from the threshold value Cta.

With this configuration, the frame number generation unit 203 can detect that the image display has started, and sets the frame number at that time to an initial value such as '1', for example. After that, the frame number is incremented by 1 at every synchronization timing (vertical synchronization signal active interval pVSb) defined by the vertical synchronization signal VSb.

Next, the operation of the frame synchronization signal separation unit 205 will be described. The frame synchronization signal separation unit 205 separates the frame synchronization signal FSa output from the frame synchronization signal combination unit 104 of the image information playback unit 10 to recover the frame number and the vertical synchronization signal, and outputs the recovered frame number and vertical synchronization signal. If there are no signal transmission or signal processing errors, the frame number and the vertical synchronization signal recovered by the frame synchronization signal separation unit 205 are identical to the vertical synchronization signal VSa and the frame number FNa used to generate the frame synchronization signal FSa in the image information playback unit 10, but they will be denoted by different reference characters LFNa and LVSa, for the purpose of distinction.

As shown in FIG. 8(d), in the frame synchronization signal FSa, one bit of the frame number signal FNa is superimposed per cycle of a 5-MHz clock (combining reference clock RSa), after the rise of the vertical synchronization signal.

From this signal, the frame synchronization signal separation unit 205 generates the vertical synchronization signal LVSa and the frame number LFNa by separation operations, which will next be described with reference to FIG. 9.

The frame synchronization signal separation unit 205 shown in FIG. 9 includes a frame synchronization signal latch unit 251, an active interval detection unit 252, a frame number extraction unit 253, and a vertical synchronization signal recovery unit 254.

The frame synchronization signal FSa is sent from the image information playback unit 10 and the separation reference clock RRb is supplied from the clock generation unit 208. A 40-MHz clock, for example, is used as the separation reference clock RRb.

The frame synchronization signal latch unit 251 latches the frame synchronization signal FSa on the separation reference clock RRb, and detects signal transition points of the frame synchronization signal FSa.

Since the frame synchronization signal combination unit 104 in the image information playback unit 10 generates the frame number signal SFNa by using a 5-MHz combining reference clock RSa, by latching the frame synchronization signal FSa on the separation reference clock RRb eight times faster, signal transition points can be detected with sufficient accuracy. This will be described with reference to FIGS. 10(a) to 10(e).

FIG. 10(a) illustrates the received frame synchronization signal FSa. FIG. 10(b) illustrates the separation reference clock RRb (40 MHz) generated in the image information playback unit 20. By latching the frame synchronization signal FSa at the rise of the separation reference clock RRb, latched data LFDa (FIG. 10(d)) is obtained.

If represented as a waveform, the latched data LFDa become the latched signal LFSa (FIG. 10(c)). A transition from 1 to 0 in the latched data LFDa can be detected as a fall (indicated by reference characters t61 in FIG. 10(d)), and a transition from 0 to 1 can be detected as a rise (indicated by reference characters t62 in FIG. 10(d)).

Next, on the basis of the latched data LFDa (FIG. 10(d)) obtained by latching, the longest low-level interval in one vertical scan interval (e.g., an interval of approximately 16.6 ms for a vertical synchronization frequency of 60 Hz) is detected by the active interval detection unit 252.

The operation of the active interval detection unit 252 will be described below with reference to FIGS. 11(a) to 11(c). In FIGS. 11(a) and 11(b), the values of the latched data LFDa in FIG. 10(d) are represented by the signal waveform LFSa, which is the same as the latched signal LFSa in FIG. 10(c), and corresponds to the frame synchronization signal FSa in FIG. 8(d).

Intervals p71, p72, p73 in FIGS. 11(a) and 11(b) respectively correspond to the intervals p51, p52, p53 in FIG. 8(d). The active interval detection unit 252 detects the part where the frame synchronization signal LFSa is kept at the low state for the longest consecutive period within/each vertical scan interval in FIG. 11(a). For that purpose, for example, it holds the latched data LFDa (FIG. 10(d)) over each vertical scan interval, compares the number of consecutive 0's that appear in each low-level interval, and identifies the low-level interval with the greatest number of consecutive 0's as the longest low-level interval, and hence as the vertical synchronization signal active interval.

The low-level interval p71 of the vertical synchronization signal is generally a low-level interval lasting several tens of microseconds or more, which is longer than one horizontal scan interval. The part p73 on which the frame number is superimposed represents 16-bit data as a pulse train synchronized with a 5-MHz clock, so that this interval has a length of 0.2 μs×16, or 3.2 μs.

When the frame number is 0x0000, the part p73 on which a frame number is superimposed is low over the entire interval as shown in FIG. 11(b), but the length of the interval is 3.2 μs, and accordingly even the longest low-level interval in the part p73 on which a frame number is superimposed is shorter than the low-level interval of the vertical synchronization signal, so that the part p73 on which a frame number is superimposed can never be detected as the low-level interval p71 of the vertical synchronization signal.

Instead of determining the low-level interval with the greatest number of consecutive 0's as the longest low-level interval, and accordingly as the vertical synchronization signal active interval, as described above, a low-level interval equal to or longer than a predetermined length may be detected as the vertical synchronization signal active interval.

Next, the frame number is extracted or separated, by the frame number extraction unit 253 in FIG. 9, from the part on which the frame number is superimposed. Following the low to high transition of the vertical synchronization signal active interval p71, a predetermined length, such as a 1-μs interval (p72) is left open, and then in the part p73 on which a frame number is superimposed, one bit of information is superimposed per 5-MHz clock cycle, so that the frame number extraction unit 253 regards the data latched by the frame synchronization signal latch unit 251 after the time when the predetermined time (1 μs) has elapsed from the low to high transition point in the vertical synchronization signal active interval p71 as representing a frame number, and thereby extracts the frame number.

As shown in FIG. 10(d), the latched data LFDa are obtained once per cycle of the separation reference clock RRb (40 MHz). That is, the reference clock RRb for separating the frame number is 40 MHz and the reference clock RSa when the frame number is superimposed is 5 MHz, so that eight clock pulse cycles of the separation reference clock RRb (40 MHz) correspond to one superimposition clock pulse cycle.

Accordingly, the frame number LFNa (FIG. 10(e)) corresponding to the superimposed frame number FNa can be obtained by using the state of the latched data LFDa in eight-pulse cycles of the separation clock.

For example, in FIG. 10(d), a sequence of eight 0's can be seen in the interval from the 1-to-0 transition (t61 in FIG. 10(d)) to the 0-to-1 transition (t62 in FIG. 10(d)) in the latched data LFDa; when converted to a 5-MHz clock, this sequence becomes zero for one clock cycle. Eight successive 0's are thus replaced with a single 0.

If the data values change during the eight 40-MHz clock cycles that correspond to one 5-MHz clock cycle, a majority decision process or the like is performed.

By the above processing, from data LFDa having one value per 40-MHz cycle, data LFNa (FIG. 10(e)) having one value per 5-MHz cycle can be obtained.

(Data representing) the frame number LFNa is reproduced by the processing described above. The reproduced frame number LFNa should be identical to the frame number FNa used in the combining process performed by the frame synchronization signal combination unit 104 of the image information playback unit 10.

The frame number extraction unit 253 outputs the data LFNa representing the frame number as described above, and also outputs a signal indicating the interval p73 on which the frame number is superimposed.

The vertical synchronization signal recovery unit 254 receives, from the frame number extraction unit 253, the signal indicating the interval p73 on which the frame number is superimposed, and restores all values to 1 (representing a high level) in the interval p73 on which the frame number is superimposed in the latched data output from the frame synchronization signal latch unit 251, thereby reproducing the vertical synchronization signal LVSa (FIG. 11(c)). The reproduced vertical synchronization signal LVSa should be identical to the vertical synchronization signal VSa used in the combining process performed by the frame synchronization signal combination unit 104 of the image information playback unit 10.

Next, the clock control unit 206 in FIG. 1 compares the frame numbers and compares the timings at which the vertical synchronization signals are generated, using the vertical synchronization signal VSb, the frame number FNb generated by the frame number generation unit 203, and the frame number LFNa and the vertical synchronization signal LVSa regenerated by the separation process performed by the frame synchronization signal separation unit 205.

First, the frame numbers are compared at the time of a high to low transition of the vertical synchronization signal VSb. The frame number generation unit 203 increments frame number FNb at a high to low transition of the vertical synchronization signal VSb, as shown in FIG. 12(c), but in making the comparison, the clock control unit 206 may use either the frame number FNb after the increment or the frame number FNb before the increment.

Specifically the frame number LFNa extracted or separated from the frame number superimposition interval p73 in a certain vertical scan interval of the frame synchronization signal LFSa as shown in FIG. 12(a) is retained until the next high to low transition time of the vertical synchronization signal VSb included in the frame synchronization signal FSb illustrated in FIG. 12(b), and is then compared with the frame number FNb (the value before or after the increment) output from the frame number generation unit 203 at the time.

The frame number LFNa may be held in the frame number extraction unit 253, but the description below will assume that it is held in the clock control unit 206.

Besides comparing the frame numbers, the clock control unit 206 compares the timing of generation of the vertical synchronization signals. This comparison is performed by comparing, for example, data (e.g., count values given by clock counters) indicating the timing of the fall of the vertical synchronization signals.

The flow of the above processing will be described with reference to FIG. 13.

Figure 13:
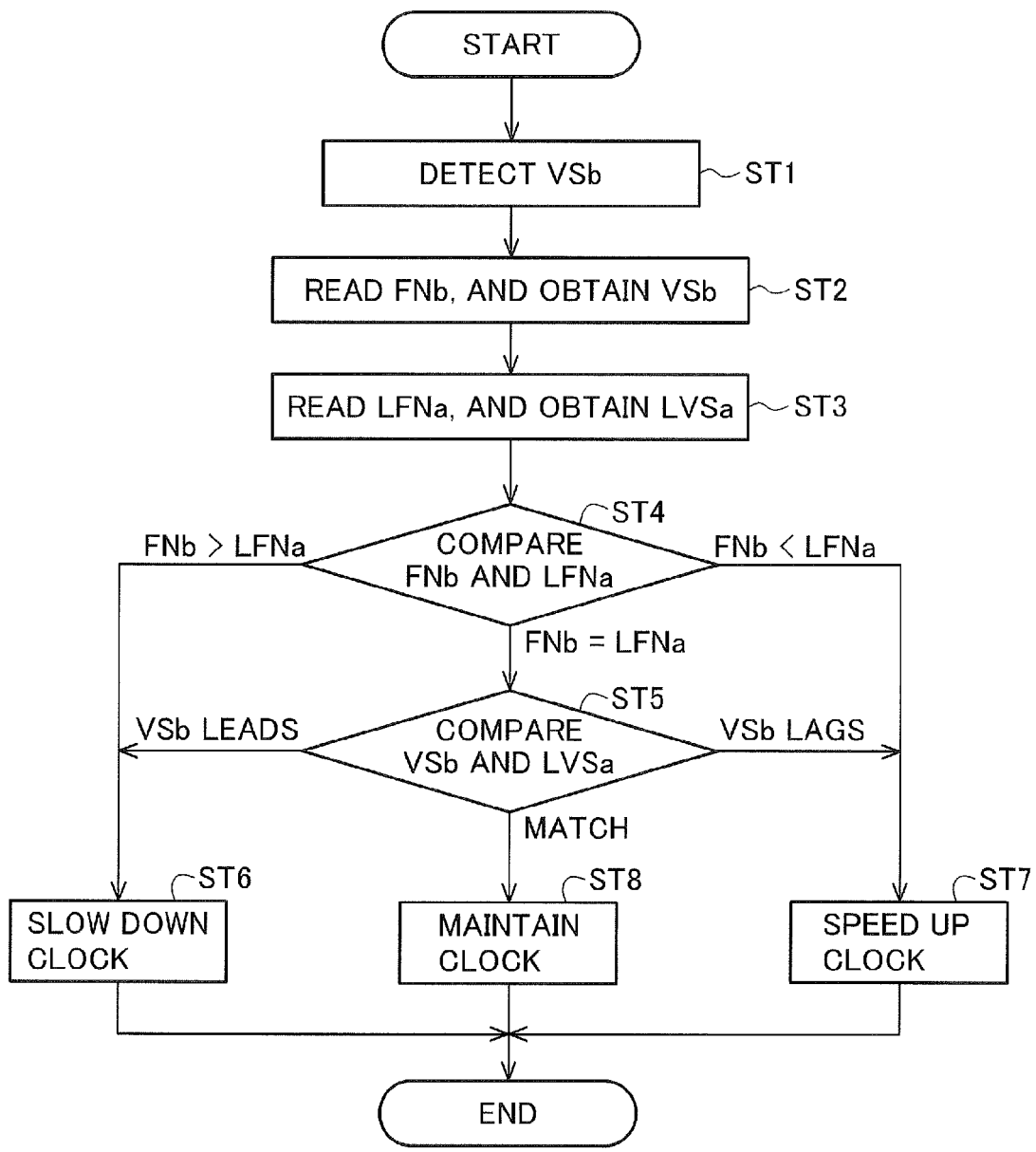
FIG. 13 is a flowchart illustrating the processing carried out by the clock control unit 206 in FIG. 1.

First, in step ST1 in FIG. 13, a high to low transition of the vertical synchronization signal VSb is detected.

Next, the frame number FNb output from the frame number generation unit 203 at that time is read (step ST2), and the frame number LFNa output from the frame synchronization signal separation unit 205 and held at that time is read (step ST3). When the frame number FNb is read in step ST2, data indicating the generation timing of the vertical synchronization signal VSb are obtained from the decoder 201, and when the frame number LFNa is read in step ST3, data indicating the generation timing of the vertical synchronization signal LVSa recovered from the frame synchronization signal LFSa in which the frame number LFNa was included are obtained from the frame synchronization signal separation unit 205.

Next, in step ST4, the frame numbers FNb and LFNa are compared; if the frame number FNb is greater than the frame number LFNa, the process proceeds to step ST6; if the frame number FNb is less than the frame number LFNa, the process proceeds to step ST7; if the frame number FNb is equal to the frame number LFNa, the process proceeds to step ST5.

In step ST5, the vertical synchronization signals VSb and LVSa are compared. If the vertical synchronization signal VSb leads the vertical synchronization signal LVSa, the process proceeds to step ST6. If the vertical synchronization signal VSb lags the vertical synchronization signal LVSa, the process proceeds to step ST7. If the generation timing of the vertical synchronization signal VSb matches the timing of the vertical synchronization signal LVSa, the process proceeds to step ST8.

In step ST6, a process of slowing (reducing the frequency of) the clocks (including the clock supplied to the decoder 201) output from the clock generation unit 208 is performed.

In step ST7, a process of speeding up (increasing the frequency of) the clocks output from the clock generation unit 208 is performed.

In step ST8, the clocks output from the clock generation unit 208 are kept running at the same (unchanged) speed.

As described above, in steps ST4 and ST5, the frame numbers LFNa and FNb are compared and the generation timings of the vertical synchronization signals LVSa and VSb are compared. If the frame number FNb is greater than the frame number LFNa, or if the frame number FNb is equal to the frame number LFNa and the vertical synchronization signal VSb leads the vertical synchronization signal LVSa, the frequency of the clock s output from the clock generation unit 208 is reduced in step ST6. If the frame number FNb is less than the frame number LFNa, or if the frame number FNb is equal to the frame number LFNa and the vertical synchronization signal VSb lags the vertical synchronization signal LVSa, the frequency of the clocks output from the clock generation unit 208 is increased. If the frame numbers FNb and LFNa are equal and the generation timing of the vertical synchronization signal VSb is identical to the generation timing of the vertical synchronization signal LVSa, the frequency of the clocks output from the clock generation unit 208 is kept at the same (unchanged) value in step ST8.

For the process in steps ST6 and ST8, the clock control unit 206 supplies the clock generation unit 208 with a clock control signal ACb indicating whether to speed up or slow down the clocks, or keep them running at the same value, and the clock generation unit 208 controls the frequency of the generated clocks in response to the clock control signal ACb.

Where a voltage-controlled crystal oscillator is used as the clock generation unit 208 as described above, the timing of the vertical synchronization signal is adjusted gradually for altering the frequency. This is because the variation range of the frequency of the voltage-controlled crystal oscillator is generally on the order of ±100 ppm. For example, when the deviation is great, the adjustment is not performed all at once in such a way that the deviation is eliminated in the next frame, but the deviation is reduced step by step over a plurality of frames.

In the above example, data representing the falling timings of the vertical synchronization signals VSb, LVSa are obtained and used in the comparison, but it is also possible for the frame synchronization signal separation unit 205 to supply the clock control unit 206 with a vertical synchronization signal LVSa having a waveform like the one shown in FIG. 11(c), for the decoder 201 to supply the clock control unit 206 with a vertical synchronization signal VSb having a waveform like the one shown in FIG. 8(c), and for a phase comparison circuit (not shown) in the clock control unit 206 to compare the phases of the supplied vertical synchronization signals LVSa and VSb.

With this configuration, in the image information playback units 10 and 20 receiving, as an input, the same content data CNT, the two images are synchronized by comparing the frame number and the vertical synchronization signal of the image decoded by the decoder 101 in the image information playback unit 10 with the frame number and the vertical synchronization signal of the image decoded by the decoder 201 in the image information playback unit 20, so that the occurrence of image display timing deviation is prevented and an image of high quality can be displayed.

Since the frame numbers are generated by use of the digital video data VDa, VDb, the vertical synchronization signals VSa, VSb, and the data enable signals DEa, DEb that are output from the decoders for use in image display, general-purpose decoders can be used.

Second Embodiment

In the first embodiment, one image information playback unit 10 is configured to operate as a master and output the frame synchronization signal FSa, and the other image information playback unit 20 is configured to operate as a slave, receive, as an input, the frame synchronization signal FSa, and adjust its timing to match the frame number and the vertical synchronization signal generated by the image information playback unit 10. Accordingly, the image information playback unit 10 and the image information playback unit 20 have different configurations. The video information playback device of the invention is not limited to this type of configuration, however; in another possible configuration a plurality of identically configured video information playback units are provided, and placed in different operating states by switching, rewiring, or other means so that one operates as a master and the other operates as a slave.

Figure 14:
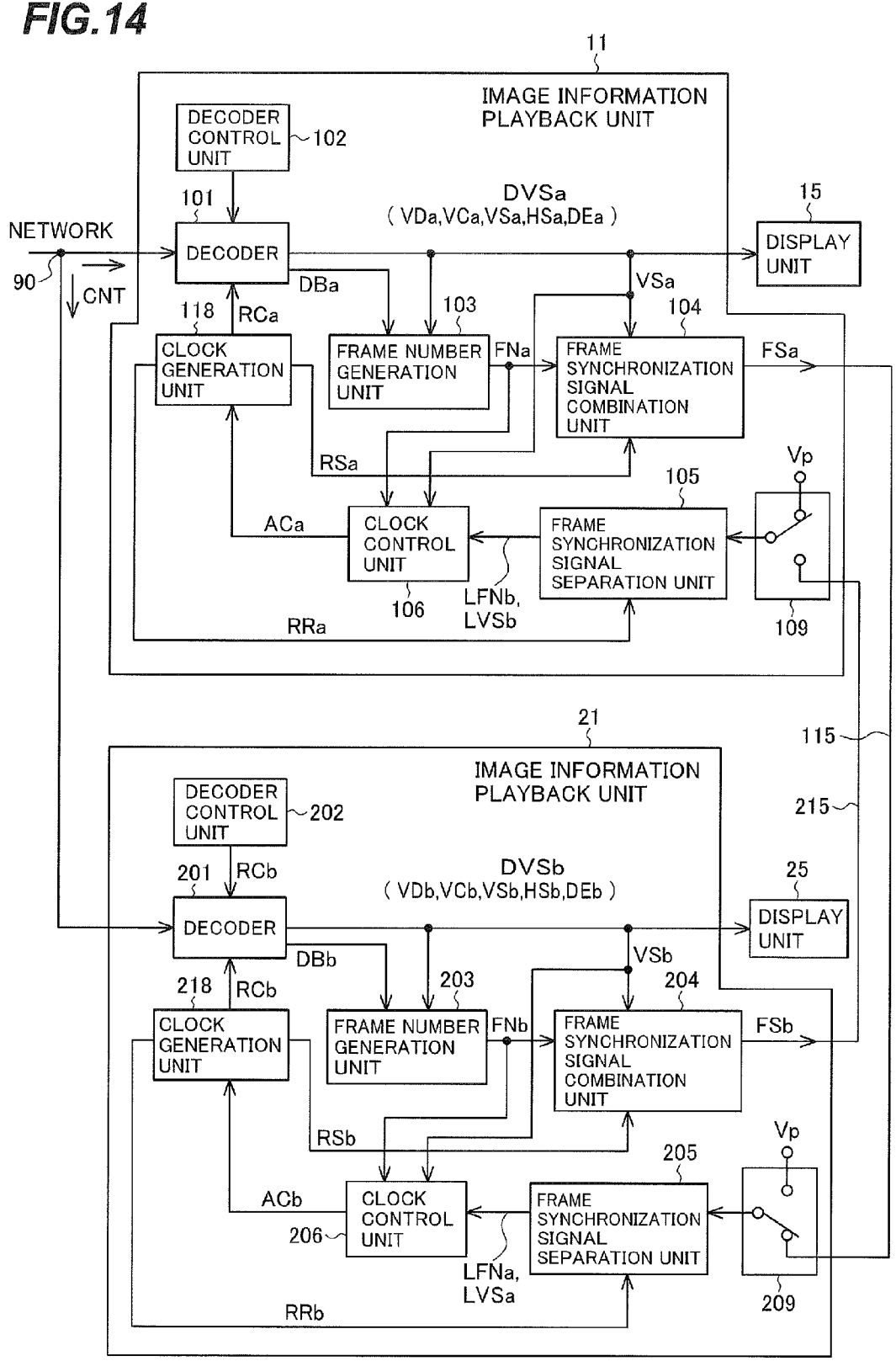
FIG. 14 is a block diagram showing the configuration of the image information playback device in a second embodiment of the invention.

FIG. 14 illustrates the video information playback device in the second embodiment. The illustrated video information playback device includes a first image information playback unit 11 and a second image information playback unit 21, each connected to a network 90 through which content data CNT are input.

Elements in FIG. 14 that are the same as in FIG. 1 have the same reference characters.

The image information playback unit 11, like the image information playback unit 10 in FIG. 1, includes a decoder 101, a decoder control unit 102, a frame number generation unit 103, and a frame synchronization signal combination unit 104.

The image information playback unit 11 in FIG. 14 also has a frame synchronization signal separation unit 105, a clock control unit 106, and a clock generation unit 118.

The frame synchronization signal separation unit 105 and the clock control unit 106 are similar to the frame synchronization signal separation unit 205 and the clock control unit 206 in the image information playback unit 20 in FIG. 1.

The oscillation frequency of the clock generation unit 118 is adjusted by a clock control signal ACa. Like the clock generation unit 208 in the image information playback unit 20 in FIG. 1, the clock generation unit 118 in FIG. 14 outputs clocks including a decode reference clock RCa and a 40-MHz separation reference clock RRa, but the clock generation unit 118 also generates a 5-MHz combining reference clock, as did the clock generation unit 107 in the image information playback unit 10 in FIG. 1.

The image information playback unit 11 in FIG. 14 further includes a switch 109.

The image information playback unit 21, like the image information playback unit 20 in FIG. 1, has a decoder 201, a decoder control unit 202, a frame number generation unit 203, a frame synchronization signal separation unit 205, and a clock control unit 206.

The image information playback unit 21 also has a frame synchronization signal combination unit 204, a clock generation unit 218, and a switch 209.

The decoder 201, the decoder control unit 202, the frame number generation unit 203, the frame synchronization signal combination unit 204, the frame synchronization signal separation unit 205, the clock control unit 206, the clock generation unit 218, and the switch 209 are respectively similar to the decoder 101, the decoder control unit 102, the frame number generation unit 103, the frame synchronization signal combination unit 104, the frame synchronization signal separation unit 105, the clock control unit 106, the clock generation unit 118, and the switch 109 in the image information playback unit 11, and operate in the same way.

The display units 15 and 25 are identical to the display units 15 and 25 in the first embodiment and operate in the same way.

The switch 109 selects, and supplies to the frame synchronization signal separation unit 105, either the frame synchronization signal FSb output from the frame synchronization signal combination unit 204 in the image information playback unit 21 and transmitted through a signal line 215, or a fixed-level signal Vp.

The switch 209 selects, and supplies to the frame synchronization signal separation unit 205, either the frame synchronization signal FSa output from the frame synchronization signal combination unit 104 in the image information playback unit 11 and transmitted through a signal line 115 or a fixed level signal Vp.

When the switch 109 is set to select the fixed level signal Vp, the switch 209 is set to select the frame synchronization signal FSa, so that the image information playback unit 11 operates as a master and the image information playback unit 21 operates as a slave.

When the switch 109 is set to select the frame synchronization signal FSb, the switch 209 is set to select the fixed level signal Vp, so that the image information playback unit 11 operates as a slave and the image information playback unit 21 operates as a master.

The fixed level signal Vp mentioned above is, for example, a high-tied signal. Here the term 'high-tied signal' means, for example, a signal obtained by connection to a high-side power source line.

The switches 109 and 209 are switched manually, for example. In this case, both of the switches 109, 209 may be manually switched separately, or the switches 109 and 209 may be configured to operate together on input of a single switching command.

The switching of the switches 109, 209 is performed when the video information device is installed, for example.

Figure 15:
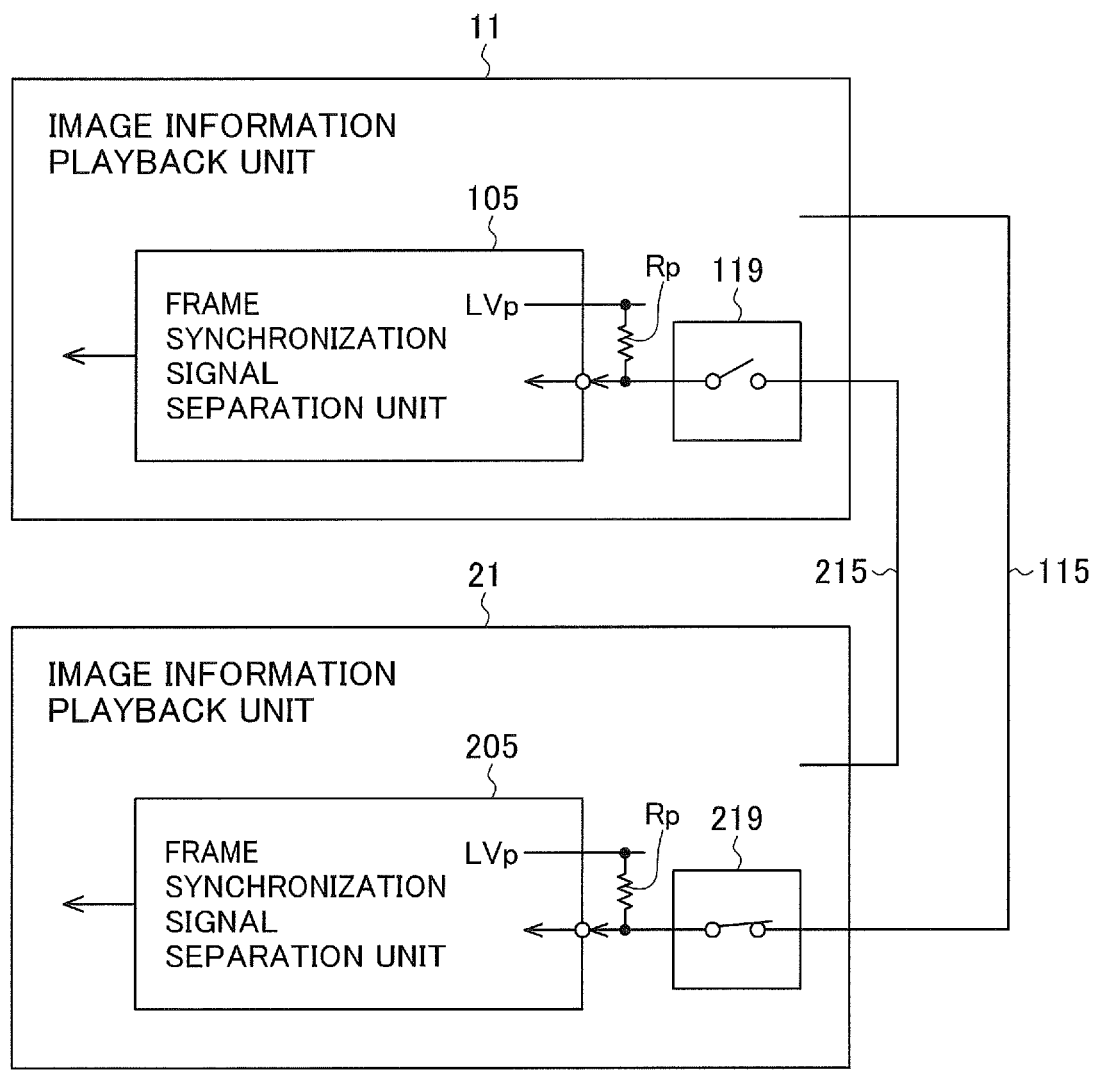
FIG. 15 is a block diagram showing a characteristic part of the configuration of a variation of the image information playback device in the second embodiment.

Instead of the selector switches 109, 209 shown in FIG. 14, connect-disconnect switches 119 and 219 as shown in FIG. 15 may be used, and the input terminals of the frame synchronization signal separation units 105, 205 may be connected to high-side power source lines LVp through, for example, a resistance elements Rp. With this configuration, when the signals are disconnected, the inputs to the frame synchronization signal separation units 105, 205 become fixed level signals. In this case, the resistance elements Rp may be included in the frame synchronization signal separation units 105, 205.

Furthermore, the frame synchronization signals FSb and FSa may be switched between the input and non-input states depending simply on whether signal lines 215 and 115 are connected to the frame synchronization signal separation units 105, 205: that is, by altering wiring connections instead of using switches 119, 219.

When the fixed level signal Vp is input to the frame synchronization signal separation unit 105 (when the frame synchronization signal FSb is not input from the image information playback unit 21), the frame synchronization signal separation unit 105 does not output a frame number and a vertical synchronization signal but outputs a predetermined signal instead.

When the clock control unit 106 does not receive a frame number and a vertical synchronization signal from the frame synchronization signal separation unit 105, it does not compare the frame numbers and outputs a clock control signal ACa requesting no change in the frequency (maintenance of the same frequency) to the clock generation unit 118. The clock generation unit 118 outputs a clock with a fixed frequency.

Accordingly, when the frame synchronization signal FSb from the image information playback unit 21 is not input to the frame synchronization signal separation unit 105, the image information playback unit 11 operates in the same overall manner as the image information playback unit 10 in FIG. 1.

When the frame synchronization signal FSb from the image information playback unit 21 is input, on the other hand, the frame synchronization signal separation unit 105 operates in the same way as described in relation to the frame synchronization signal separation unit 205 in FIG. 1; accordingly, the image information playback unit 11 operates in the same overall manner as the image information playback unit 20 in FIG. 1.

When the fixed level signal Vp is input to the input terminal of the frame synchronization signal separation unit 205 (when the frame synchronization signal FSa is not input from the image information playback unit 11), the frame synchronization signal separation unit 205 does not output a frame number and a vertical synchronization signal but outputs, for example, a predetermined signal.

When the clock control unit 206 does not receive a frame number and a vertical synchronization signal from the frame synchronization signal separation unit 205, it does not compare the frame numbers and outputs a clock control signal ACb requesting no change in the frequency (maintenance of the same frequency) to the clock generation unit 218.

Accordingly, when the frame synchronization signal FSa from the first image information playback unit 11 is not input to the frame synchronization signal separation unit 205, the image information playback unit 21 operates in the same overall way as the image information playback unit 10 in FIG. 1.

When the frame synchronization signal FSa from the first image information playback unit 11 is input, however, the frame synchronization signal separation unit 205 operates as described in relation to the frame synchronization signal separation unit 205 in FIG. 1; accordingly the image information playback unit 21 operates in the same overall manner as the image information playback unit 20 in FIG. 1.

When the fixed level signal Vp is input to the input terminal of the frame synchronization signal separation unit 105 in the image information playback unit 11, the frame synchronization signal FSb output from frame synchronization signal combination unit 204 is not used in the image information playback unit 21.

Conversely, when the fixed level signal Vp is input to the input terminal of the frame synchronization signal separation unit 205 in the image information playback unit 21, the frame synchronization signal FSa output from the frame synchronization signal combination unit 104 is not used in the image information playback unit 11.

The image information playback unit 11 and the image information playback unit 21 therefore have the same configuration but operate differently when their setting states or connection states are made different: one then operates as a master; the other operates as a slave.

In the exemplary configuration described above, in the video information playback unit operating as a master, e.g., in the image information playback unit 11, a fixed level signal Vp is input to the signal input terminal of the frame synchronization signal separation unit 105, but the image information playback unit 11 may be configured so that the frame synchronization signal FSa output from the frame synchronization signal combination unit 104 is input to frame synchronization signal separation unit 105. In this case, a frame synchronization signal FSa is input to the frame synchronization signal separation unit 105, as a reference frame synchronization signal, so that although the frame number and the vertical synchronization signal included in the frame synchronization signal FSa are output from the frame synchronization signal separation unit 105, they are the same as the frame number generated by the frame number generation unit 103 and the vertical synchronization signal output by the decoder 101; the clock control unit 106 therefore determines that the frame numbers match and there is no deviation in the vertical synchronization signal, and sends the clock generation unit 118 a clock control signal ACa not requesting any frequency change.

The clock generation unit 118 therefore outputs a clock with a fixed frequency.

When the video information playback units are configured as described above, the configurations of the individual video information playback units can be made identical. Even when the signals at the input terminals of the frame synchronization signal separation units are determined by wiring changes, it is only necessary to provide identical video information playback units, so that the construction of the video information playback device can be simplified.

The image information playback unit (11) operating as a master may be configured so that the frame synchronization signal from the other image information playback unit (21) is not input to the frame synchronization signal separation unit (105), or may be configured so that the frame synchronization signal from the frame synchronization signal combination unit in the same image information playback unit is input to the frame synchronization signal separation unit.

This can synchronize the display on the image information playback unit operating as a slave with the display on the image information playback unit operating as a master.

Third Embodiment

In the first embodiment, the frame number generation unit 103 is configured so that after it recognizes from the decode begin signal DBa that decoding has started, it reads the valid data (the data during the interval (valid interval) in which the data enable signal DEa indicates that the data are valid) of the digital video data VDa on the basis of the data enable signal DEa, over one frame interval from the low to high transition of the vertical synchronization signal VSa to the next transition to the valid state, and when the number of pixels with valid data values other than 0 reaches or exceeds the threshold value Cta, it decides that there has been a change in the image, that is, that image display has started. But, it is not necessary to read all the digital video data. When the digital video data consist of digital data representing a red component, a green component, and a blue component, the decision may be made by using only one component, or by using only the least significant bit of one or each of the color components.

Because it is the least significant bit that changes most frequently when the image changes, basing the decision only on the least significant bit has the advantage of simplifying the configuration of the frame number generation unit 103 and enabling the decision that a change has occurred in the image to be made with a minimum of data processing.

In the first embodiment, the frame number generation unit 103 is configured so that after it recognizes from the decode begin signal DBa that decoding has started, it reads the valid data (the data during the interval (valid interval) in which the data enable signal DEa indicates that the data are valid) of the digital video data VDa on the basis of the data enable signal DEa, over one frame interval from the low to high transition of the vertical synchronization signal VSa to the next transition to the valid state, and when the number of pixels with valid data values other than 0 reaches or exceeds the threshold value Cta, it decides that there has been a change in the image, that is, that image display has started. But, this decision may alternatively be made by taking a valid data value other than 0 as a predetermined value (initial state value), counting the number of pixels per frame with a values other than the predetermined value, and deciding whether or not the count has reached or exceeded the predetermined threshold value Cta. The decision may still alternatively be made by taking the data value of each pixel in the valid interval of each frame as the initial state value, deciding whether the data value of each pixel differs from the initial data value of the same pixel in the preceding frame, counting the number of pixels per frame with differing data values, and deciding whether or not the count has reached or exceeded the threshold value Cta.

In each case, the frame in which the number of pixels reaches or exceeds the threshold value Cta may be determined to be the frame in which there has been a change in the image and that frame may be recognized as the first image.

Figure 16:
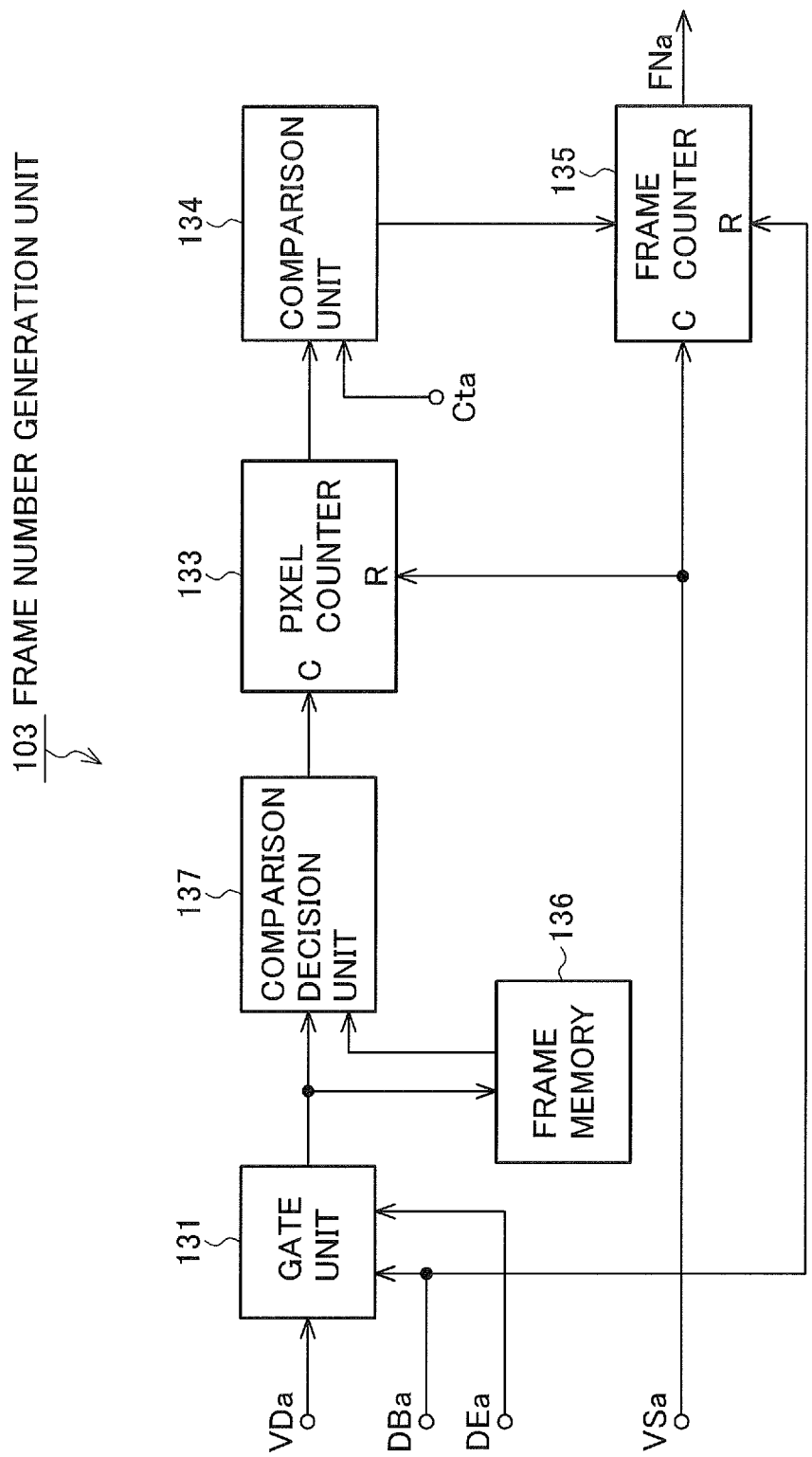
FIG. 16 is a block diagram showing an exemplary configuration of the frame number generation unit used in the image information playback device in a third embodiment of the invention.

When the data value of each pixel in the valid interval for each frame is set as the initial state value, the frame number generation unit 103 is configured as shown, for example, in FIG. 16. The frame number generation unit 103 shown in FIG. 16 is generally the same as the frame number generation unit 103 shown in FIG. 2, but a frame memory 136 is added and a comparison decision unit 137 is used in place of the pixel value decision unit 132.

The frame memory 136 stores (as initial state values) one frame of data, storing the data for each frame that have passed through a gate unit 131.

When the data in the frame following the frame whose data have been stored in the frame memory 136 are supplied through the gate unit 131, the comparison decision unit 137 compares the supplied pixel data with the pixel values of the corresponding pixels in the previous frame stored in the frame memory 136, and if they differ, outputs a signal (e.g., a signal representing '1') indicating that they differ.

The pixel counter 133 counts the number of times the signal indicating the difference in the pixel values is generated by the comparison decision unit 137.

The comparison unit 134 decides that there has been a change in the image, that is, that display has begun, when the count given for each frame by the pixel counter 133 reaches or exceeds the predetermined value Cta.

When the count value given for each frame by the pixel counter 133 does not reach the predetermined value Cta or more, the same processing as the above is repeated.

For the above processing, while the data of each pixel that has passed through the gate unit 131 are supplied to the comparison decision unit 137 and used for the comparison of pixels as described above, the data are also supplied to the frame memory 136, which is thereby rewritten, and the rewritten data are used as the initial state value for deciding whether or not there has been a change in the pixel values in the next frame.

The rest, that is, the operation of the gate unit 131, the comparison unit 134, and the frame counter 135, is as described with reference to FIG. 2 in the first embodiment.

Fourth Embodiment

An example in which two interconnected video information playback units 11 and 21 were synchronized was described in the second embodiment; in the fourth embodiment, an example in which two more video information playback units 31 and 41 are connected and a large screen display device is configured with four display units 15, 25, 35, 45 arranged, for example, in two rows and two columns will be described.

Figure 17:
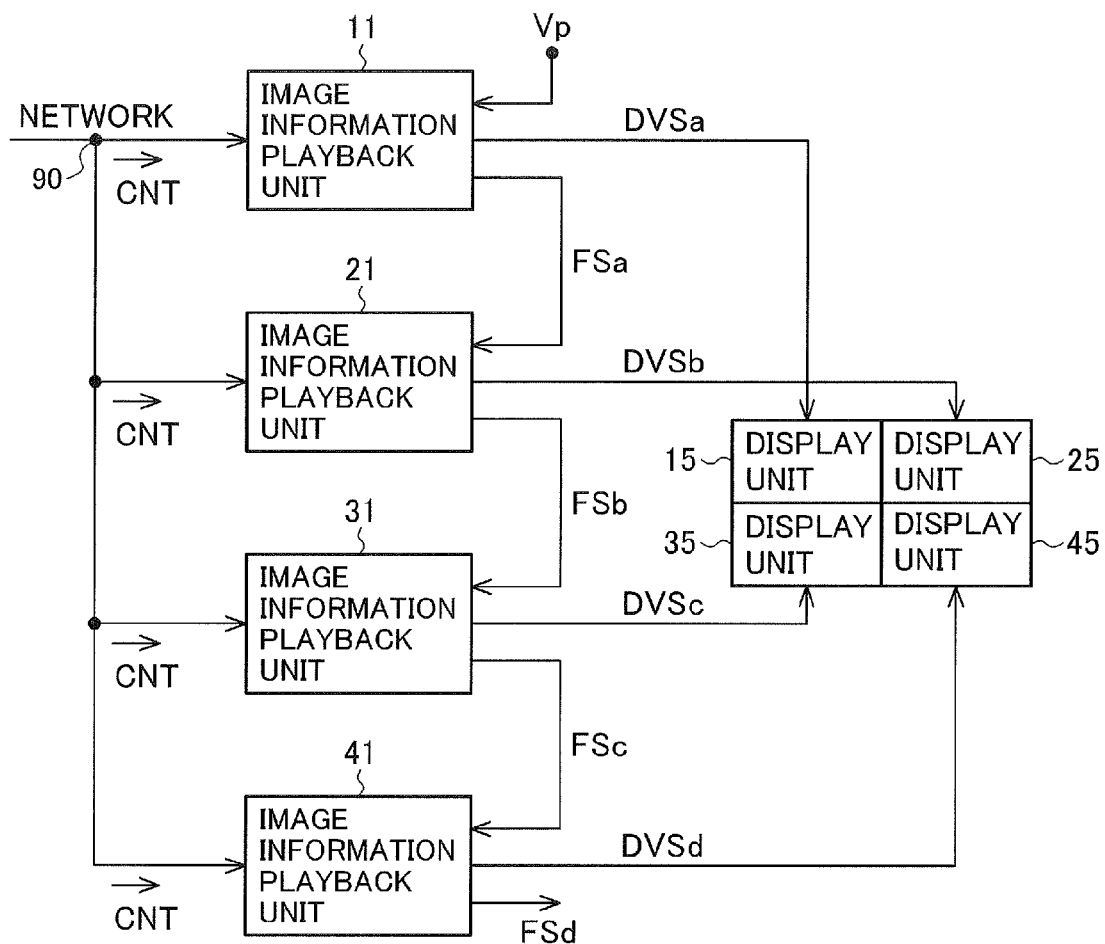
FIG. 17 is a block diagram showing the configuration of the image information playback device in a fourth embodiment of the invention.

FIG. 17 illustrates a configuration in which four video information playback units 11, 21, 31, 41 are interconnected to form a display device with a large 2×2 display screen. Digital video signals DVSa, DVSb, DVSc, DVSd each including digital video data, a vertical synchronization signal, a horizontal synchronization signal, and a data enable signal are supplied from the image information playback units 11, 21, 31, 41 to corresponding display units 15, 25, 35, 45.

Each of the image information playback units 11, 21, 31, 41 is configured in the same way as the image information playback units 11, 21 described in the second embodiment with reference to FIGS. 14 and 15.

The fixed level signal VP is input to the input terminal of the frame synchronization signal separation unit (e.g., here and below, a unit like the frame synchronization signal separation unit 105 shown in FIG. 14) of the image information playback unit 11, the frame synchronization signal FSa output from the frame synchronization signal combination unit (e.g., here and below, a unit like the frame synchronization signal combination unit 104 shown in FIG. 14) of the image information playback unit 11 is input to the frame synchronization signal separation unit of the image information playback unit 21, the frame synchronization signal FSb output from the frame synchronization signal combination unit of the image information playback unit 21 is input to the frame synchronization signal separation unit of the image information playback unit 31, the frame synchronization signal FSc output from the frame synchronization signal combination unit of the image information playback unit 31 is input to the frame synchronization signal separation unit of the image information playback unit 41, the image information playback unit 21 is made to operate in synchronization with the frame synchronization signal FSa output from the image information playback unit 11, the image information playback unit 31 is made to operate in synchronization with the frame synchronization signal FSb output from the image information playback unit 21, and the image information playback unit 41 is made to operate in synchronization with the frame synchronization signal FSc output from the image information playback unit 31.

In this case, the image information playback unit 21 is a slave with respect to the image information playback unit 11 but is also the master with respect to the image information playback unit 31, and the image information playback unit 31 is a slave with respect to the image information playback unit 21 but is also the master with respect to the image information playback unit 41.

With the configuration described above, the image information playback units 11, 21, 31, 41 are all mutually synchronized.

The display unit 15 performs display based on the digital video signal DVSa output from the image information playback unit 11, the display unit 25 performs display based on the digital video signal DVSb output from the image information playback unit 21, the display unit 35 performs display based on the digital video signal DVSc output from the image information playback unit 31, and the display unit 45 performs display based on the digital video signal DVSd output from the image information playback unit 41.

This configuration enables synchronized display on each of the display units even in a video playback device including four video information playback units.

In another possible configuration, one of the image information playback units 11, 21, 31, 41, for example, the image information playback unit 11, is used as a master and the other image information playback units 21, 31, 41 are used as slaves; that is, the other image information playback units 21, 31, 41 all receive input of the frame synchronization signal FSa output from the image information playback unit 11, and their frame synchronization signals FSb, FSc, FSd are synchronized with the frame synchronization signal FSa.

When the same content is supplied to the four image information playback units 11, 21, 31, 41 through the network 90 and is displayed on their four display units 15, 25, 35, 45, the change in the image displayed on the four display units 15, 25, 35, 45 is identical, so that the frame number generation units in each video information playback unit (e.g., units like the frame number generation unit 103 shown in FIG. 14) can be synchronized because they start counting the frame number at the same timing.

However, in some cases, mutually differing images are displayed on the four display units 15, 25, 35, 45. In one exemplary case, one quarter of a combined image is displayed on each of the four display units 15, 25, 35, 45 of a large 2×2 screen display. This case requires a configuration that sends the data for upper left part, the data for the upper right part, the data for the lower left part, and the data for the lower right part data to the image information playback units 11, 21, 31, 41 for display on their respective display units 15, 25, 35, 45.

Figure 18:
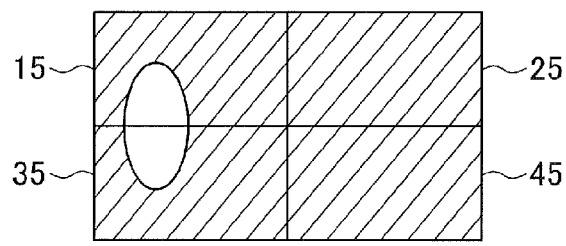
FIG. 18 is a diagram showing an example of a picture displayed by the image information playback device in the fourth embodiment.

Sometimes the data in the upper right part and the data in the lower right part, for example, both start as black pictures (having pixel values of 0 over the entire screen), as shown in FIG. 18.

In this case, the images can be synchronized by a configuration in which an image other than a black picture is inserted as the first image in content starting with a black picture, the inserted image is used as the initial state image, and as described in the third embodiment, the starting image of the content is detected based on the number of pixels in the valid interval in each frame with data differing from the data in the preceding frame.

For example, by inserting an image such that the least significant bit of the digital video data is 1 into an inconspicuous part of the display screen, such as the edges of the screen, before the first frame of the content image on the upper right and lower right display units 25, 45, the frame number generation units can start counting the frame number and synchronization can be achieved even with black picture content.

When the video information playback device is configured with a plurality of video information playback units, the number of the video information playback units is '2' in the second embodiment, and '4' in the fourth embodiment, but the number of the video information playback units is not limited to '2' or '4'. Even when the number is other than '2' or '4', it suffices to connect them so that one of any pair of video information playback units is the master and the other of the pair is the slave.

REFERENCE CHARACTERS

10, 11, 20, 21, 31, 41 image information playback unit; 15, 25, 35, 45 display unit; 101, 201 decoder; 102, 202 decoder control unit; 103, 203 frame number generation unit; 104, 204 frame synchronization signal combination unit; 105, 205 frame synchronization signal separation unit; 106, 206 clock control unit; 107, 118, 208, 218 clock generation unit.

What is claimed is:

1. A video information playback unit, comprising:
a clock generation unit that generates a decode reference clock signal;
a decoder that receives, as inputs, the decode reference clock signal supplied from the clock generation unit and content data including an image, outputs digital video data, a vertical synchronization signal, a horizontal synchronization signal, and a video clock, and also outputs a decode begin signal indicating that the decoder has started decoding the content data;
a frame number generation unit that receives, as inputs, the digital video data, the vertical synchronization signal, the video clock, and the decode begin signal, and after recognizing from the decode begin signal that decoding has started, recognizes from a change in the digital video data that display of the image has started, and generates a frame number based on the vertical synchronization signal;
a frame synchronization signal combination unit that combines the frame number generated by the frame number generation unit and the vertical synchronization signal output from the decoder and outputs a frame synchronization signal;
a frame synchronization signal separation unit that receives, as an input, a reference frame synchronization signal or a fixed level signal and, when the reference frame synchronization signal is input, separates the input frame synchronization signal and outputs a reference vertical synchronization signal and a reference frame number; and a clock control unit that compares the frame number generated by the frame number generation unit with the frame number output from the frame synchronization signal separation unit, further compares generation timings of the vertical synchronization signal output from the decoder and the vertical synchronization signal output from the frame synchronization signal separation unit, and generates a clock control signal based on results of the comparison; wherein the clock generation unit adjusts a frequency of the decode reference clock signal on a basis of the clock control signal output from the clock control unit.

2. A video information playback device comprising a plurality of the video information playback units of claim 1, configured so that the frame synchronization signal output by the frame synchronization signal combination unit of a first video information playback unit, which is one of the plurality of video information playback units, is input to the frame synchronization signal separation unit of a second video information playback unit, which is another one of the plurality of video information playback units, as the reference frame synchronization signal.

3. The video information playback device of claim 2, wherein:

when the fixed level signal is input to the frame synchronization signal separation unit of each of the plurality of video information playback units, the frame synchronization signal separation unit outputs a predetermined signal; and when the frame synchronization signal separation unit of each of the video information playback units outputs the predetermined signal, the clock control unit of the same video image playback unit outputs, to the clock generation unit, a signal for maintaining a frequency of the clock.

4. The video information playback unit of claim 1, wherein the frame number generation unit identifies a first frame after the start of decoding when the digital video data output from the decoder change from an initial state.

5. The video information playback unit of claim 1, wherein:

the frame number generation unit stores an initial state of the digital video data output from the decoder and identifies a first frame after the start of decoding when the digital video data output from the decoder change from the stored initial state.

6. The video information playback unit of claim 4, wherein:

the digital video data include digital data representing a red component, a green component, and a blue component of the image; and the frame number generation unit determines presence or absence of a change in the digital video data on a basis only of a least significant bit of the digital data of at least one of the red component, the green component, and the blue component output from the decoder.

7. The image information playback device of claim 2, wherein:

the frame synchronization signal separation unit of the first video information playback unit receives, as an input, the frame synchronization signal output by the frame synchronization signal combination unit of the first video information playback unit as the reference frame synchronization signal;

the frame synchronization signal separation unit of the first video information playback unit separates the frame synchronization signal input from the frame synchronization signal combination unit of the first video information playback unit, thereby generating the reference frame number and the reference vertical synchronization signal; and the clock control unit of the first video information playback unit compares the frame number output by the frame number generation unit of the first video information playback unit with the frame number output by the frame synchronization signal separation unit of the first video information playback unit, and compares the generation timings of the vertical synchronization signal output by the decoder of the first video information playback unit and the vertical synchronization signal output by the frame synchronization signal separation unit of the first video information playback unit.

8. A synchronization control method for synchronizing image output in a plurality of video information playback units in a video information playback device, each video information playback unit including a clock generation unit that generates a decode reference clock signal, and a decoder that receives, as inputs, the decode reference clock signal supplied from the clock generation unit and content data including an image, outputs digital video data, a vertical synchronization signal, a horizontal synchronization signal, and a video clock, and also outputs a decode begin signal indicating that the decoder has started decoding the content data, the synchronization control method comprising:

executing, in each of the plurality of video information playback units, a frame number generation step that receives, as inputs, the digital video data, the vertical synchronization signal, the video clock, and the decode begin signal, and after recognizing from the decode begin signal that decoding has started, recognizes from a change in the digital video data that display of the image has started, and generates a frame number based on the vertical synchronization signal;

executing, in a first video information playback unit which is one of the plurality of video information playback units, a frame synchronization signal combination step that combines the frame number generated by the frame number generation unit and the vertical synchronization signal output from the decoder and outputs a frame synchronization signal;

executing, in a second video information playback unit which is another one of the plurality of video information playback units, a frame synchronization signal separation step that separates the frame synchronization signal generated in the frame synchronization signal combination step in the first video information playback unit, and generates a vertical synchronization signal and a frame number, and a clock control step that compares the frame number generated in the frame number generation step with the frame number generated in the frame synchronization signal separation step, further compares generation timings of the vertical synchronization signal output from the decoder in the second video information playback unit and the vertical synchronization signal generated in the frame synchronization signal separation step, and generates a clock control signal based on results of the comparison; wherein the clock generation unit in the second video information playback unit adjusts a frequency of the decode reference clock signal on a basis of the clock control signal.

9. The synchronization control method of claim 8, wherein:

the digital video data include digital data representing a red component, a green component, and a blue component of the image; and the frame number generation step in each of the first and second video information playback units determines presence or absence of change in the digital video data on a basis only of a least significant bit of the digital data of at least one of the red component, the green component, and the blue component digital data output from the decoder in the video information playback unit.

* * * * *